No. 728,629. PATENTED MAY 19, 1903.
J. F. SICKENBERGER.
ATTACHMENT FOR REAPERS OR MOWERS.
APPLICATION FILED APR. 15, 1902.

NO MODEL.

WITNESSES:
Edward Thorpe
Fred Acker

INVENTOR
John Francis Sickenberger
BY
ATTORNEYS

No. 728,629. Patented May 19, 1903.

UNITED STATES PATENT OFFICE.

JOHN FRANCIS SICKENBERGER, OF MANZANOLA, COLORADO.

ATTACHMENT FOR REAPERS OR MOWERS.

SPECIFICATION forming part of Letters Patent No. 728,629, dated May 19, 1903.

Application filed April 15, 1902. Serial No. 102,955. (No model.)

*To all whom it may concern:*

Be it known that I, JOHN FRANCIS SICKENBERGER, a citizen of the United States, and a resident of Manzanola, in the county of Otero and State of Colorado, have invented a new and useful Attachment for Reapers or Mowers, of which the following is a full, clear, and exact description.

The purpose of the invention is to provide a standing cutter-bar and sickle for the grain or grass boards of reapers and mowers and operated through the movement of the main or horizontal sickle, which auxiliary sickle will serve to cut any tangled hay, grain, clover, grass, or field-peas which may fall over the grass or grain board and have a tendency to catch in the rakes or choke or clog the machine, thus leaving the path of the grass or grain board unobstructed.

The invention consists in the novel construction and combination of the several parts, as will be hereinafter fully set forth, and pointed out in the claims.

Reference is to be had to the accompanying drawings, forming a part of this specification, in which similar characters of reference indicate corresponding parts in all the figures.

Figure 1:
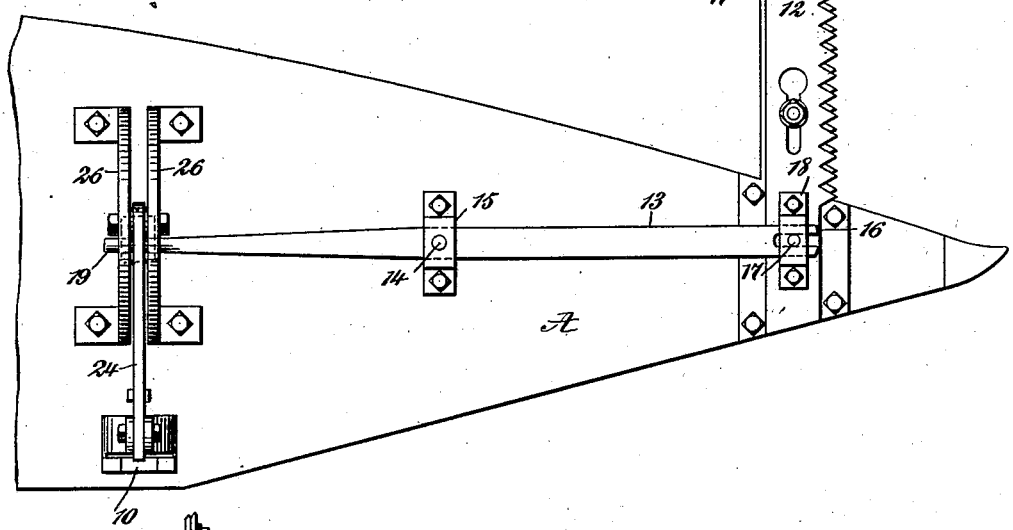
Figure 2:
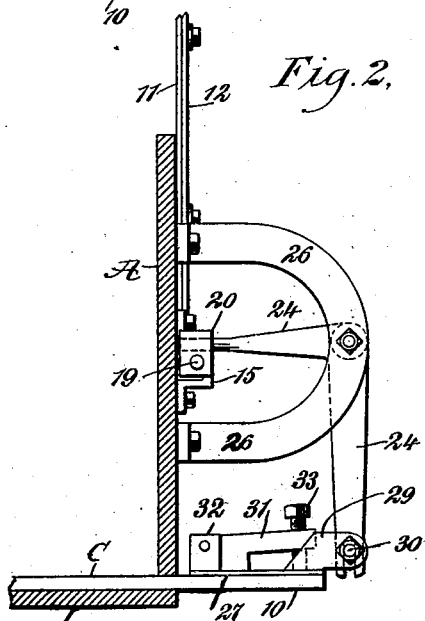
Figure 3:
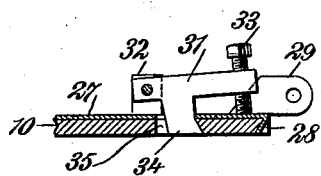
Figure 4:
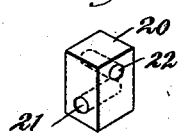

Figure 1 is an outer face view of the grass or grain board of the reaper or mower, illustrating the operation of the improvement. Fig. 2 is a rear edge view of the grass or grain board and the attachment and a rear edge view of a portion of the main sickle and support. Fig. 3 is a longitudinal section through the extended end of the main sickle-bar and a sectional side elevation of a detachable coupling device applied thereto, and Fig. 4 is a detail perspective view of a coupling-block employed in the construction of the improvement.

A represents the grain or grass board of a reaper or mower, B the main cutter-bar, and C the main or horizontal sickle, one end 10 of which extends out through an opening in the grain or grass board, as is shown in Figs. 1 and 2.

Upon the outer surface of the grain or grass board A, near its forward end, an upright cutter-bar 11 is rigidly secured, and a sickle 12 is mounted to have end movement upon the upright cutter-bar. The upright or auxiliary sickle is operated through the medium of a lever 13, connected with the projecting end of the main sickle C in a manner to be hereinafter described. The lever 13 is fulcrumed at or near its center upon the grain or grass board by a pivot-pin 14, which is preferably passed through a guide-strap 15 for the lever 13, and the forward end 16 of the lever 13 is bifurcated or slotted to receive a pin 17, preferably passed through the strap-guide 18 for the forward end of the lever and secured to the upright sickle 12 at a point near its bottom. The rear or handle end 19 of the aforesaid lever 13 is rounded or is circular in cross-section and is loosely passed through an opening 21 in a coupling or connecting block 20, (shown in detail in Fig. 3 and applied in Fig. 2,) and this block 20 is provided with a second opening 22, independent of and at right angles to the opening 21. This second opening 22 loosely receives the rounded end of a horizontal member of an elbow-lever 24, the vertical member whereof has a bifurcated connection with the outer end 10 of the main or horizontal sickle C, as will be hereinafter described. This elbow-lever 24 at the junction of its members is fulcrumed centrally between the curved sections of arched brackets 26, secured to the grain or grass board and extending at right angles thereto, as is shown in Figs. 1 and 2. As the machine advances the vertical auxiliary sickle 12 is operated by a connection with the main sickle C and will cut away material which may hang over the grain or grass board and tend to obstruct the path of the machine or clog any of its working parts.

The connection between the elbow-lever 24 and the projecting end 10 of the main sickle-bar C is preferably made as is shown in Figs. 2 and 3, wherein a base-plate 27 rests upon the projecting end 10 of the sickle-bar, having a downwardly and inwardly inclined tongue 28 at its outer end, which enters a similar recess in the outer end of the said projection 10 of the main sickle-bar, as is best shown in Fig. 3, and this base-plate 27 is provided with outwardly-extending horizontal ears 29 at its outer end, through which a bolt 30 is passed, receiving the bifurcated lower end of the elbow-lever 24, as is shown in Fig. 2. The base-plate 27 is detachably connected to the projecting section 10 of the main sickle-bar C by a lock-lever 31, fulcrumed between lugs 32, carried upward from the base-plate, and at the outer end of said lever a set-screw 33 is located, having bearing upon the base-plate. Near the pivot end of the lock-lever 31 a downwardly-extending lug 34 is formed, which enters an opening 35, made in the base-plate 27 and the projection 10 from the main sickle-bar, and the outer edge of the tongue and the outer end wall of the opening 35 are downwardly and outwardly inclined, so that when the screw 33 is tightened on the base-plate the tongue 34 exerts pressure against the projection 10 of the main sickle-bar and against the inward pressure of the tongue 28, forming a portion of the base-plate 27. By this coupling device the base-plate 27 may be removed from the main sickle-bar C whenever it is desired to withdraw said sickle-bar from the machine.

In the operation of the improvement as the main sickle C is horizontally reciprocated the elbow-lever 24 is given vertical movement by reason of the rounded part of its upper portion playing loosely in the opening 22 in the coupling-block 20, and as the coupling-block is thus given vertical movement it practically slides on the rounded or handle end 19 of the lever 13, causing the latter to operate the auxiliary sickle 12 in a vertical direction or in a direction at right angles to the path of operation of the main sickle C.

Having thus described my invention, I claim as new and desire to secure by Letters Patent—

1. In reapers or mowers, a grain or grass board, a main or horizontal sickle, an auxiliary standing sickle carried by the grain or grass board, a lever fulcrumed at or near its center upon the grain-board and operatively connected at one end with the standing sickle, and an elbow-lever connected with the other end of the first-mentioned lever and with the main sickle, as set forth.

2. In reapers and mowers, the combination with the grass or grain board and the main or horizontal sickle of the machine, of a standing sickle carried by the grain-board, a lever pivoted on the board in operative connection with the standing sickle, a second lever operatively connected with the said main sickle, and a coupling between the two levers whereby to operate the standing sickle from the main sickle in a path at an angle to the path of the said main sickle, as described.

3. In reapers and mowers, the combination with the grass or grain board and the main sickle of the machine, one end of which main sickle extends out through the grain-board, of a standing sickle carried by the grain-board, a lever fulcrumed upon the grain-board, being operatively connected with the standing sickle, an elbow-lever mounted on the grain-board and connected with the projecting end of the main sickle, and a coupling-block provided with openings extending through the same, the openings being at right angles to each other, one opening being adapted to receive a member of the elbow-lever and the other opening an end of the lever connected with the standing sickle, for the purposes set forth.

4. In reapers and mowers, a grain or grass board, a main or horizontal sickle, a standing sickle carried by the grain-board, operating mechanism for the standing sickle, and a coupling device between the main sickle and the said operating mechanism, the said coupling device comprising a base-plate connected with the said operating mechanism, and engaging the main sickle-bar, a lever fulcrumed at one end on the base-plate and carrying a set-screw at its other end having bearing on the base-plate, and a lug on said lever adapted to enter an opening in the base-plate and the main sickle-bar, as set forth.

5. In reapers and mowers the combination with the grain or grass board, and the main or horizontal sickle of the machine, of a standing sickle carried by the grain-board, means for operating the standing sickle, a detachable connection between the operating means and the main sickle, and comprising a base-plate connected with the said operating mechanism and engaging the main sickle-bar, and a lever for locking the said plate and sickle-bar together, as set forth.

6. In reapers and mowers, the combination with the grass or grain board, and the main or horizontal sickle of the machine, of a standing sickle carried by the grain-board, a lever pivoted on the grain-board and operatively connected with the standing sickle, a second lever, connected by a coupling with the first lever, a detachable connection between the said second lever and the main sickle, and a locking device for said connection, as set forth.

In testimony whereof I have signed my name to this specification in the presence of two subscribing witnesses.

JOHN FRANCIS SICKENBERGER.

Witnesses:
  JOHN C. VROMAN,
  CLAYTON H. GREEN.